United States Patent Office 3,590,047
Patented June 29, 1971

3,590,047
2-BENZOYLBENZIMIDAZOL-1-YLACETIC ACIDS
Tsung-Ying Shen, Westfield, and Alexander R. Matzuk, Colonia, N.J., and Harvey Schwam, Flushing, N.Y., assignors to Merck & Co., Inc., Rahway, N.J.
No Drawing. Continuation-in-part of application Ser. No. 598,607, Dec. 2, 1966. This application Oct. 18, 1968, Ser. No. 768,883
Int. Cl. C07d 49/38
U.S. Cl. 260—309.2                                                5 Claims

ABSTRACT OF THE DISCLOSURE 2-benzoylbenzimidazol-1-ylacetic acids and derivatives are prepared which have anti-inflammatory properties.

---

This is a continuation-in-part of co-pending U.S. application Ser. No. 598,607, filed Dec. 2, 1966, now abandoned.

This invention relates to new chemical compounds. More particularly, it relates to a new class of compounds of the benzimidazole series. Still more particularly, it is concerned with benzimidazole substituted at the 1-position with an acetic acid and further substituted at the 2-position with an aromatic or heteroaromatic group of less than three fused rings. The invention also relates to salts, amides, anhydrides, and esters of such compounds. The invention also relates to the process by which these valuable compounds may be prepared, and to novel intermediates used in said process.

The new benzimidazole compounds of the invention may be represented by the general structural formula

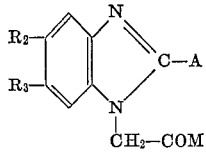

in which:

A is a substituted or unsubstituted aralkyl, heteroaralkyl, aroyl or heteroaroyl radical including, for example, benzyl, benzoyl or substituted derivatives thereof or those in which the heteroaromatic radicals are such as furyl, isonicotinyl, thienyl, pyrryl, thiazolyl, thiadiazolyl, pyrazinyl, pyridinyl, quinolyl, isoquinolyl, pyrazolyl, imidazolyl, oxazolyl, pyrimidinyl, or a benz derivative thereof such as benziso-oxazolyl, benzimidazolyl, benzofuranyl, benzothiazolyl, benzotriazolyl, benzoxazolyl, benzothienyl, indazolyl and isoindazolyl;

$R_2$ is hydrogen, hydroxy, lower alkyl, lower alkoxy, nitro, amino, lower alkylamino, di(lower alkyl) amino, lower alkanoylamino, lower alkanoyl, bis(hydroxy lower alkyl) amino, 1-pyrrolidino, 4-methyl-1-piperazinyl, 4-morpholinyl, cyano, trifluoromethyl, halogen, di(lower alkyl) sulfamyl, benzylthio, amino lower alkyl, trifluoromehylthio, benzyloxy, lower alkenyl, lower alkenyloxy, 1-azacyclopropyl, cyclopropyl, cyclopropyl (lower alkoxy) and cyclobutyl (lower alkoxy); the loweralkenyl and alkyl groups containing up to six carbon atoms;

$R_3$ is hydrogen, halogen, trifluoromethyl, a lower alkyl radical containing, for example, up to six carbon atoms, such as methyl, ethyl, isobutyl or hexyl or a lower alkoxy radical containing, for example, up to six carbon atoms, such as methoxy, isopropoxy, butoxy and pentoxy.

M is $R_4$ or $R_5$, $R_4$ being amino (provided A is not benzyl at the same time), methylamino, ethylamino, propylamino, butylamino, dimethylamino, diethylamino, methylethylamino, methylbutylamino, dibutylamino, glucosamino, glycosylamino, allylamino, phenethylamino, N-ethylphenethylamino, β-hydroxyethylamino, 1 - ethyl-2-aminoethyl piperidino, tetrahydrofurfurylamino, 1,2,5,6 - tetrahydropyridino, morpholino, N-methyl piperazino, piperazino, N-phenylpiperazino, piperidino, benzylamino, anilino, cyclohexylamino, pyrrolidino, N-hydroxyethylpiperazino, sodium β - sulfoethylamino, N,N - dimethylcarboxamidomethylamino, N,N-diethylaminoethylamino, p-methoxyanilino, and 1-methyl-2-aminoethyl-pyrrolidino, $R_5$ being hydroxyl or a hydrocarbonoxy group including lower alkoxy, benzyloxy, phenoxy, ethoxyethoxy, diphenylmethoxy, triphenylmethoxy, cyclopropoxy, β-diethylaminoethoxy, β-dimethylaminoethoxy, β-acetaminoethoxy, phenethoxy, allyloxy, isopropoxy, cyclopropylmethoxy, tetrahydrofurfuryloxy, cyclohexyloxy, cyclopentyloxy, cyclopropylethoxy, p-acetaminophenoxy, o-carboxyphenoxy, polyhydroxy lower alkyl such as glycerol, polyhydroxy cycloalkyl such as inositol and 1,4-cyclohexanediol, polyalkoxy lower alkyl such as the polyalkyl ethers derived from sorbitol, mannitol or other sugar alcohols containing up to six carbon atoms in the basic chain, and compounds where $R_5$ is a cyclic lower alkylamino lower alkyl radical derived from N-(β-hydroxyethyl) piperidine, N-(β-hydroxyethyl) pyrrolidine, N-(β-hydroxyethyl) morpholine, N-methyl-2-hydroxymethyl pyrrolidine, N-methyl-2-hydroxymethyl piperidine, N-ethyl-3-hydroxy piperidine, 3-hydroxyquinuclidine and N-(β-hydroxyethyl)-N-methyl piperazine.

M also includes OZ, where Z is a cation including metals such as alkali or alkaline earth metals, or OY where Y is acyl, including lower alkanoyl, aroyl, aralkanoyl or a group of the formula

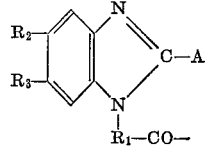

wherein A, $R_1$, $R_2$ and $R_3$ are as defined above.

It has been found that benzimidazole compounds substituted as described above possess a useful degree of anti-inflammatory activity and also exhibit anti-pyretic and analgesic activity. They are further of value in the treatment of arthritic and dermatological disorders and in like conditions which are responsive to treatment with anti-inflammatory agents. For these purposes they are normally administered orally in tablets or capsules, the optimm dosage depending, of course, on the particular compound being used and the type and severity of the condition being treated. Although the optimum quantities of the compounds of this invention to be used in such manner will depend on the compound employed and the particular type of disease condition treated, oral dose levels of preferred compounds in the range of 10–2000 mg. per day are useful in control of arthritic conditions, depending on the activity of the specific compound and the reaction sensitivity of the patient.

Various tests in animals can be carried out to show the ability of compounds of this invention to exhibit reactions that can be correlated with anti-inflammatory activity in humans.

One such test, the Carrageenin test, is used to show the ability of compounds to inhibit edema induced by injection of an inflammatory agent into the tisses of the foot of a rat against non-inflamed controls. This Carrageenin testing method is known to correlate well with anti-inflammatory activity in humans and is a standard test used to determine anti-inflammatory activities. This correlation has been shown by the activities of compounds known to be clinically active, including Indocin, aspirin, Butazolidin, Tandearil, Cortone, Hydrocortone, Decadron. In view of the results of this test, the instant compounds can be considered to be active anti-inflammatory agents.

A further test also shows the ability of componds to inhibit edema in the Adjuvant arthritis test. This testing method is also known to correlate with anti-inflammatory activity in humans. This test also indicates that the instant compounds can be considered active anti-inflammatory agents.

In addition to their pharmacological activity, the acid products of this invention are useful as intermediates in preparing the ester and amide derivatives described and claimed herein. The said esters and amides also exhibit anti-inflammatory activity and, therefore, are useful in the treatment of these disorders.

The esters, salts, anhydrides and amides of the acetic acids represent an additional aspect of the invention. In some cases, the esters are intermediates in the synthesis of the free acids and are often themselves of importance as end products. The preferred esters are the lower alkyl and aralkyl esters such as methyl, ethyl, propyl, t-butyl, benzyl and like esters. The salts, anhydrides and amides of these compounds can be prepared by treating the benzimidazole acetic acid or ester with appropriate reagents or compounds to produce the desired derivatives.

The following compounds are representative of those contemplated by this invention. These and others may be prepared by the procedures discussed herein below.

α-[2-(p-chlorobenzyl)-5-methoxy-1-benzimidazolyl] acetic acid;

methyl-α-[2-(p-trifloroacetylbenzoyl)-5-dimethylamino-1-benzimidazolyl] acetate;

2-benzoyl-5-chloro-1-(4-methylpiperazinocarbonyl-methyl)benzimidazole;

α-[2-p-chlorobenzoyl)-5-methoxy-1-benzimidazolyl] acetic anhydride;

β-acetaminoethyl-α-[2-(N,N-dimethyl-p-sulfonamidobenzyl)-5-allyloxy-1-benzimidazolyl] acetate;

N-(β-diethylaminoethyl)-α-[2-(2-thenoyl)-5-methoxy-1-benzimidazolyl] acetamide;

allyl-α-[2-(p-methylsulfinylbenzyl)-5-acetamido-1-benzimidazolyl] acetate.

A feature of these compounds is the presence of an aralkyl, aroyl, heteroaralkyl or heteroaroyl radical attached to the 2-position of the benzimidazole nucleus. These groups may be further substituted in the aromatic ring with hydrocarbon radicals such as lower alkyl, or with functional substituents such as hydroxy or an etherified hydroxy (hydrocarbonoxy) group such as a lower alkoxy, e.g., methoxy, ethoxy, isopropoxy, allyloxy, propoxy, lower alkanoyloxy, an aryloxy or aralkoxy group, e.g., phenoxy, benzyloxy, and the like. It may be a nitro radical; a halogen such as chlorine, bromine, iodine or fluorine; an amino group or a substituted amino group, representative examples of which are acylamino, amine oxide, ketimines, urethanes, lower alkylamino, lower dialkylamino; lower alkanoylamino, amidine, acylated amidines, hydrazine or a substituted hydrazine, alkoxyamines and sulfonated amines. Further, it may be a mercapto or a substituted mercapto radical of the type exemplified by alkylthio groups such as methylthio, ethylthio, and propylthio and aralkylthio or arythio groups, e.g., benzylthio and phenylthio. The aryl moiety of the radical may, if desired, be haloalkylated, as with a trifluoromethyl, trifluoroethyl, perfluoroethyl, β-chloroethyl or like substituent, acylated as with lower alkanoyl such as acetyl, or propionyl, benzoyl, phenacetyl, halogenoacetyl, trifluoroacetyl, diloweralkylaminoacetyl and like acyl groups, or it may contain a haloalkoxy or haloalkylthio substituent. In addition, the invention embraces compounds wherein the aryl moiety contains a sulfamyl, benzylthiomethyl, cyano, sulfonamido, lower alkylsulfinyl, lower alkylsulfonyl or dialkylsulfonamido radical, amino lower alkyl and di(lower alkyl) amino lower alkyl. Further, it may contain a carboxy substituent, or a derivative thereof, such as an alkali metal salt, di(lower alkyl) carboxamido, amido, azido, or a lower alkyl ester of the carboxy radical or an aldehyde derivative of the type represented by acetals or thioacetals. In the preferred compounds, this aromatic radical is benzyl and the functional substituent is in the para position of the six-membered ring.

The most preferred compounds of this invention are those represented by the general formula where A is p-substituted benzyl or benzyl (the halo substituent being most preferred), M is hydroxy, lower alkoxy, benzyloxy and amino and $R_2$ is lower alkoxy, halo, nitro and di(lower alkyl) amino and $R_3$ is hydrogen.

It has been observed that when this aromatic group is an aroyl or heteroaroyl radical attached to a nitrogen of the benzimidazole, it is easily hydrolyzed under conditions normally employed for saponification of an ester of the invention to the corresponding free acid. For this reason, care must be taken in attempting such conversion. One convenient method comprises acylation of the benzyl ester and subsequent hydrogenolytic removal of the benzyl group. Alternatively, other esters such as the t-butyl esters, which are amenable to selective removal by other treatment, such as heating above 210° C. or by treatment at 25°–110° C. with a catalytic amount of an aryl sulfonic acid or other like acids, may be utilized.

A presently preferred process of synthesizing the subject benzimidazole acetic acids and derivatives comprises reacting an o-phenylenediamine with a reagent which will produce a benzimidazole in which the carbon of the heterocyclic ring is substituted with the desired group with a group which may be converted to the desired substituent and thereafter substituting the additional substituent to produce a compound of the invention. Flow Sheet I shows the sequence for the preparation of such compounds.

FLOW SHEET I

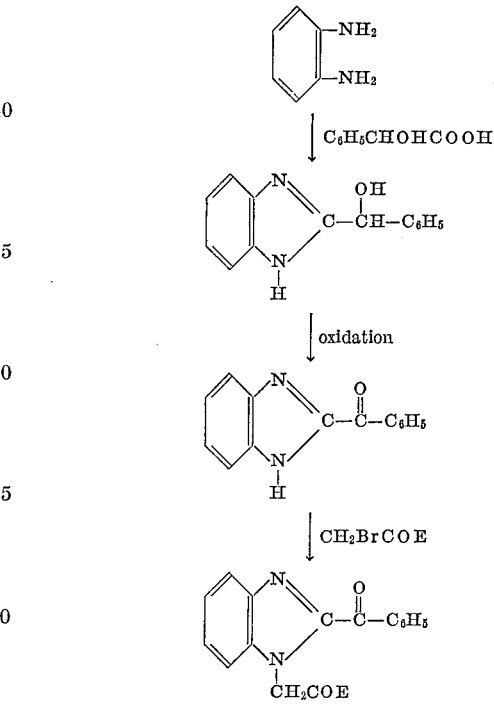

E=a lower alkoxy, aryloxy or aralkoxy group, suitably methoxy, ethoxy, t-butoxy or benzyloxy.

The product is an α-(2-benzoyl-1-benzimidazolyl) acetate.

In accordance with Flow Sheet I, the benzimidazole is synthesized by a procedure which produces an intermediate in which the acyl group is substituted on the 2-position. This is accomplished by the reaction of an o-phenylenediamine with an acid, the latter having an α-carbon with the desired aryl or heteroaryl group and a hydroxy radical substituted thereon. In Flow Sheet I, this reagent is mandelic acid. This reaction is carried out in the presence of acidic catalysts, including mineral acids such as hydrochloric, preferably with the solvent for the mineral acid serving as the carrier of the reaction. This solvent is preferably a polar solvent, suitably water or a lower alkanol. The use of an excess of the α-hydroxy acid component will promote a greater yield of reaction product, as will an inert atmosphere, suitably nitrogen. The temperature of the reaction will vary from about 75° C. to about 125° C., preferably maintained by refluxing at the boiling point of the mixture for a period of from about 1 to about 4 hours.

Oxidation of the α-hydroxy radical of this product yields a 2-acyl benzimidazole. Any of a number of known oxidizing agents may be employed. Oxidizing agents such as sodium dichromate or potassium permanganate, in the presence of a mineral acid such as glacial acetic or sulfuric acid are preferred. With these reagents, the reaction is carried out at a temperature between about 50° C. and 95° C., for about 3 minutes to about ½ hour. The oxidized product is isolated in any convenient manner, for example, by adding water to the mixture and filtering.

In the next step, the 2-acylated benzimidazole is treated with an α-bromo acetic acid ester to substitute the desired substituent on the nitrogen of the heterocyclic ring.

In the reaction, the available amino hydrogen of the benzimidazole is replaced by the acetic acid residue. This is preferably done by obtaining an alkali derivative of the starting compound at the 1-position, suitably by reacting the 2-acyl benzimidazole with an alkali metal hydride, such as sodium hydride in a solvent such as dimethylformamide, toluene or xylene at temperatures from about $-10°$ C. to about $+15°$ C. for about 15 minutes to about 1 hour. The resulting derivative, still in solution since it is not necessary to isolate it at this point, has the selected α-bromo acetate ester added to it dropwise to form a compound of the invention. It has been found that stirring the reaction mixture under nitrogen for periods of from about 8 to about 24 hours after the addition of the bromo reagent enhances product yields. This 2-acyl-1-benzimidazolyl acetate is isolated, preferably by adding the mixture to ice water, extracting with a solvent in which it is soluble and evaporating that solvent to produce the compound.

The o-phenylenediamine compounds used as starting compounds for the synthesis of the compounds of this invention are known reagents. The benzene ring may carry, in addition to the two amino groups, from 1 to 2 substituents of a number of types, preferably alkyl, alkoxy, nitrogen, and sulfur derivatives, with the 4-position of the benzene ring preferably so substituted.

It will be recognized that position isomers of the compounds of the invention heretofore described are possible because the reaction taking place at the nitrogen of the imidazole ring may cause substitution of the 1- or the 3-position of the nucleus, since the cyclization reaction produces 2 isomeric formulae which may be shown thus:

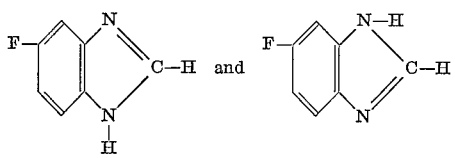

Both of these compounds will produce substituted products at the nitrogen with the replaceable hydrogen and yield a combination of the 5 and 6 fluoro isomers of the products. These may be separated and isolated by chromatography or any other technique which lends itself to the resolution of isomers of this type. In the interests of simplicity we will show only 1 isomer as the product of reactions involving this structure in the example and discussion given hereafter. Thus, when a 4-methyl compound of the invention is prepared, the isomeric 7-methyl product also synthesized will not be shown. Of course, in the special case where there is no substitutent on the benzenoid ring, only one product is formed.

If an aralkyl group is desired at the 2-position of the benzimidazole structure instead of the acyl group shown in Flow Sheet I, the α-hydroxy acid of that procedure is replaced by an acid with the desired aralkyl or heteroaralkyl group attached to the carbon of the carboxylic acid radical. Thus, if a o-phenylenediamine is reacted with an aryl or heteroaryl acetic or like acid reagent, the product would be a 2-aralkyl or heteroalkyl benzimidazole. An example which demonstrates the reaction sequence described shows the preparation of α-[-(p-chlorobenzyl-5-methylthio-1-benzimidazolyl] acetic acid.

FLOW SHEET II

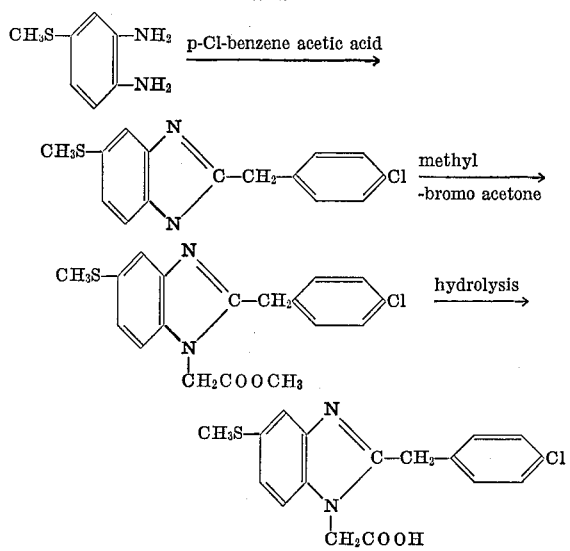

As may be seen, the only major difference between this product and the product of Flow Sheet I is the aralkyl group on the 2-position.

If the desired compound of the invention is an ester, it may be prepared directly as, e.g., via the procedure of Flow Sheet I, or an acid prepared by the procedure described above can be esterified thereafter. This may be accomplished by any suitable esterification procedure, such as by reaction of the ester with the selected alkanol in the presence of a mineral acid such as sulfuric acid or hydrogen chloride. After formation, the ester is isolated by any suitable procedure, such as extraction by a solvent for the ester followed by removal of that solvent.

In addition to the acids and esters, other derivatives of the compounds of the invention may also be prepared, as was indicated heretofore. For example the acid compound of this invention may be converted to the corresponding amide by reaction with ammonia or primary or secondary amines, via the corresponding anhydride, mixed anhydride or ester, in the usual manner. A slight excess of the amine is used as one method of obtaining good yields, and a temperature range of from about 15° C. to 50° C. is preferred although a wider range of from 10° C. to 80° C. may be used for a reaction period of from about 30 minutes to about 6 hours.

Metallic salts and organic ammonium salts of the acid compounds can also be formed by reacting the acid compound with an appropriate base. These salt-forming reactions are preferably carried out with an excess of the basic reagent present to increase yields, at temperatures from about $-10°$ C. to about 50° C. for periods of from about ten minutes to about 2 hours.

Anhydrides of the acids represent an additional aspect of the invention. The symmetrical anhydride is prepared by intermolecular dehydration of the acid, accomplished by the use of a mild dehydrating agent, dicyclohexylcarbodiimide being the most suitable. A mixed anhydride is formed by reaction of a non-hydroxylic base such as a tertiary alkylamine, pyridine and the like on the acid, followed by treatment of this acid salt with an acid halide such as an alkyl or aryl chloroformate, phosphorous oxychloride, thionyl chloride or similar reagent.

Anhydride synthesis is carried out on those acids of the invention which have no active OH, SH or NH group. Thus, for example, if a primary or secondary amino group is substituted on the 5-position of the nucleus, the group must first be protected before attempting to produce an anhydride.

The synthesis of various compounds of this invention having a 5-substituent with a nitrogen attached to the homocyclic ring of the benzimidazole is generally based upon the 5-nitro compound, which is transformed into the desired 5-substituent. Such transformation can be carried out in a number of ways. Reduction of the 5-nitro group gives a 5-amino group, reaction of the amino with alkyl halides gives mono and dialkyl amino groups. If the alkyl halide is a dihaloalkylene group (e.g., 1,4-dibromobutane), a heterocyclic ring (e.g., pyrrolidino) is formed. Similarly, bis($\beta$-chloroethyl) ether will give an N-morpholino compound. Alkylation can also be carried out simultaneously with reduction, as e.g., formaldehyde, Raney nickel and hydrogen. Acylation can be carried out on the 5-amino compound or on the 5-nitro (with simultaneous reduction) to give 5-acylamido compounds. The 5-amino group can be reacted with isocyanates to give 5-ureido compounds.

The procedures outlined heretofore can be altered somewhat without departing from the spirit and scope of this invention. Each one of the procedures is not necessarily applicable to the preparation of all the compounds within the scope of the invention. Problems arising in the synthesis may be obviated by appropriate selection of the order in which reactions are performed, or by the use of blocking groups in accordance with standard practices.

The following examples are used for purposes of illustration and should not be considered as limiting the invention.

EXAMPLE 1

(A) 2-($\alpha$-hydroxy-p-chlorobenzyl) benzimidazole.—A mixture of 0.1 mole of o-phenylenediamine and 0.15 mole of p-chloromandelic acid is refluxed in 100 ml. of 4 N hydrochloric acid for 1.5 hours under a nitrogen blanket. The reaction mixture is cooled, diluted with water and the mixture filtered and washed with water to yield 2-($\alpha$-hydroxy-p-chlorobenzyl) benzimidazole.

Similarly, 2 - ($\alpha$-hydroxy-p-chlorobenzyl)-5-substituted benzimidazoles are prepared by replacing the o-phenylenediamine of this procedure with the appropriate compounds. By using an appropriately substituted mandelic acid as well, the following compounds are prepared:

2-($\alpha$-hydroxy-p-methoxybenzyl)-5-methoxybenzimidazole
2-($\alpha$-hydroxy-p-nitrobenzyl)-5-fluorobenzimidazole
2-($\alpha$-hydroxy-p-methylbenzyl)-5-phenylbenzimidazole
2-($\alpha$-hydroxy-o-methylbenzyl)-5-chlorobenzimidazole
2-($\alpha$-hydroxy-m-trifluoromethylbenzyl)-5-methyl-
  benzimidazole
2-($\alpha$-hydroxy-3,4-methylenedioxybenzyl)-5-trifluoro-
  methylthiobenzimidazole
2-($\alpha$-hydroxy-o-chlorobenzyl)-5-methylthiobenz-
  imidazole.

In like manner, by substituting other $\alpha$-hydroxy aroyl and heteroaroyl acids, similar 2-(substituted-$\alpha$-hydroxy) benzimidazoles are prepared.

(B) When aralkyl and heteroaralkyl carboxylic acids are substituted for p-chloromandelic acid in the reaction of this example the corresponding 2-substituted benzimidazoles are produced, for example:

2-(p-chlorobenzyl)-5-methylbenzimidazole
2-benzyl-5-trifluoromethylbenzimidazole.

EXAMPLE 2

(A) 2-(p-chlorobenzoyl) benzimidazole.—A solution of 5.15 grams of sodium dichromate in 30 ml. of glacial acetic acid is heated on a steam cone and added to a warm solution of 0.025 mole of 2-($\alpha$-hydroxy-p-chlorobenzyl) benzimidazole in 30 ml. of glacial acetic acid. The mixture is heated on a steam cone for ten minutes, cooled and diluted with water. The resulting precipitate is filtered and washed with water to yield 2-(p-chlorobenzoyl) benzimidazole.

In like manner the other $\alpha$-hydroxy benzimidazoles of Example 1 are converted to the corresponding 2-acylbenzimidazoles.

EXAMPLE 3

(A) Methyl $\alpha$-[2-(p-chlorobenzoyl)-1-benzimidazolyl] acetate.—A mixture of 0.07 mole of 2-(p-chlorobenzoyl) benzimidazole in 200 ml. of dry dimethylformamide is cooled to 0° C. and then 0.1 mole of sodium hydride is cautiously added. The mixture is stirred for twenty minutes and then 0.09 mole of methyl bromoacetate is added dropwise. After stirring overnight under a nitrogen atmosphere the mixture is poured into iced water and extracted with ethyl acetate. This ethyl acetate extract is washed with a 10% sodium dihydrogen phosphate solution, then water, dried over anhydrous sodium sulfate and concentrated in vacuo to produce methyl $\alpha$-[2-(p-chlorobenzoyl)-1-benzimidazolyl] acetate, which is purified by chromatography.

In a similar manner, the other 2-acyl benzimidazoles prepared in Example 2 are substituted for 2-(p-chlorobenzoyl) benzimidazole in the above procedure to produce the corresponding $\alpha$-(2-substituted-1-benzimidazolyl) acetic acid methyl ester.

Also, by using ethyl $\alpha$-bromopropionate in place of methyl bromoacetate in the above procedure, or any other $\alpha$-bromo acetic or propionic ester, the corresponding 1-benzimidazolyl esters are prepared, for example:

ethyl $\alpha$-[2-(p-methylthiobenzoyl)-5-nitro-1-benzimid-
  azolyl] acetate;
benzyl $\alpha$-[2-(m-trifluoromethylbenzoyl)-5-fluoro-1-
  benzimidazolyl] propionate;
t-Butyl $\alpha$-[2-(p-methoxybenzoyl)-5-methoxy-1-benz-
  imidazolyl] propionate.

(B) By substituting the 2-aralkyl and heteroaralkyl benzimidazoles produced in Example 1B in the procedures of this example, the corresponding 2-substituted-1-benzimidazolyl esters are produced, for example:

ethyl $\alpha$-[2-(p-chlorobenzyl)-5-methyl-1-benzimidazolyl]
  acetate;
t-Butyl $\alpha$-(2-benzyl-5-trifluoromethyl-1-benzimidazoyl)
  acetate;
phenyl $\alpha$-[2-(p-chlorobenzoyl)-1-benzimidazoyl] acetate;
pentyl $\alpha$-[2-(p-dimethylaminobenzoyl)-5-nitro-1-
  benzimidazolyl] acetate.

EXAMPLE 4

$\alpha$-[2-(p-chlorobenzyl)-1-benzimidazolyl] acetic acid

A total of 0.02 mole of methyl $\alpha$-[2-(p-chlorobenzyl)-1-benzimidazolyl] acetate is refluxed for two hours in a 10% potassium bicarbonate/methanol solution. The soluton is neutralized with 2.5 N hydrochloric acid, filtered and the precipitate dried in vacuo to yield $\alpha$-[2-(p-chlorobenzyl)-1-benzimidazolyl] acetic acid.

Similarly, any other ester of the invention which does not contain easily hydrolizable substituents may be converted to the corresponding acid by this procedure to produce for example:

$\alpha$-[2-(p-chlorobenzyl)-5-nitro-1-benzimidazolyl] acetic
  acid.

EXAMPLE 5

(A) Methyl α-[2-(p-chlorobenzoyl)-5-(1-pyrrolidino)-1-benzimidazolyl] acetate.—A mixture of 0.01 mole of methyl α - [2-(p-chlorobenzoyl)-5-amino-1-benzimidazolyl] acetate, 1 g. of 1,4-dibromobutane and 0.975 g. of anhydrous sodium carbonate in 80 ml. of ethanol is stirred at reflux for six hours, under nitrogen. The reaction mixture is then filtered and the filtrate concentrated in vacuo to a small volume and diluted with ether. The solution is washed twice with water, dried in anhydrous sodium sulfate and concentrated in vacuo to dryness to produce methyl α-[2 - (p - chlorobenzoyl)-5-(1-pyrrolidino)-1-benzimidazolyl] acetate.

When ethylene dibromide is used instead of dibromobutane, the product obtained is the 5-(1-azacyclopropyl) benzimidazole.

(B) Methyl α-[2-(p - chlorobenzoyl)-5-bis(β-hydroxyethyl) amino-1-benzimidazoyl] acetate.—A mixture of 0.02 mole of methyl α-[2-(p-chlorobenzoyl)-5-amino-1-benzimidazolyl] acetate, 0.044 mole of ethylene oxide and 0.03 mole of acetic acid in 300 ml. of dimethoxyethane is heated to 50° C. in an autoclave for 18 hours. The mixture is then diluted with water and filtered to yield methyl α-[2 - (p - chlorobenzoyl)-5-bis(β-hydroxyethyl) amino-1-benzimidazolyl] acetate.

When an equivalent amount of propylene oxide is used in the procedure of this part in place of ethylene oxide there is obtained the 5-bis(β-hydroxypropyl) amino homologue.

(C) Methyl α-[2 - (p - chlorobenzoyl)-5-(4-methyl-1-piperazinyl)-1-benzimidazolyl] aceate.—The product of Part B is stirred with 2 mole proportions of p-toluenesulfonyl chloride in pyridine until the reaction is substantially complete. The mixture is then poured into water and the 5-bis(p-toluenesulfonyloxyethyl) amino compound is isolated and dissolved in benzene. One mole of methylamine is added and the mixture is allowed to stand at room temperature for three days, then poured into iced water containing two equivalents of sodium carbonate and immediately extracted with ether. Evaporation of the ether yields methyl α-[2-(p-chlorobenzoyl)-5-(4-methyl-1-piperazinyl)-1-benzimidazolyl] acetate.

(D) Methyl α-[3-(p-cholobenzoyl)-5-(4-morpholinyl)-1-benzimidazolyl] acetate.—A solution of tosyl chloride (0.1 mole) in 200 ml. benzene is added dropwise, with stirring, to a solution of 0.1 mole of methyl α-[2-(p-chlorobenzoyl)-5-bis(β-hydroxyethyl)amino - 1 - benzimidazolyl] acetate and 0.3 mole of pyridine in 300 ml. of benzene. The addition is made at room temperature over a period of one hour and then the mixture is heated at reflux for three hours, then washed with water, dried over sodium sulfate and the solvent evaporated to yield methyl α-[2 - (p - chlorobenzoyl)-5-(4-morpholinyl) - 1 - benzimidazolyl]acetate.

(E) The procedures of this example are employed using other 5-amino compounds of the invention to produce the corresponding 5-substituted benzimidazole esters, for example:

cyclopentyl α-[2-(p-benzoxazole-2-carbonyl)-5-dimethylamino-1-benzimidazolyl] acetate;
benzyl α-[2-(p-methoxybenzyl)-5-(4-methyl-1-piperazinyl)-1-benzimidazolyl] acetate.

EXAMPLE 6

α-[2-(p-chlorobenzoyl)-5-methyl-1-benzimidazolyl] acetic acid

A mixture of 0.005 mole of t-butyl α-[2-(p-chlorobenzoyl)-5-methyl-1-benzimidazolyl] acetate and about 1 g. of fine porous-plate chips is heated slowly in an oil bath, under nitrogen, until isobutylene starts to escape. Stirring is initiated and the temperature held constant for about one hour. On cooling, the residue is extracted with saturated sodium bicarbonate solution, filtered, the aqueous solution washed with 100 ml. ether, made neutral with 1 N hydrochloric acid and lyophilized to give α-[2-(p-chlorobenzoyl)-5-methyl-1-benzimidazolyl] acetic acid.

Similar treatment of any other t-butyl ester will yield the corresponding free acid, for example: α-[2-(p-acetylbenzoyl)-5-(1-pyrrolidino)-2-benzimidazolyl] acetic acid is produced by treatment of its t-butyl ester according to this procedure.

EXAMPLE 7

(A) Sodium α - [2-(p-chlorobenzoyl)-5-methyl-1-benzimidazolyl] acetate.—A mixture of 0.001 mole of α-[2-(p-chlorobenzoyl)-5-methyl-1-benzimidazolyl] acetic acid and 0.001 mole of sodium hydroxide in 100 ml. of water is stirred until solution is complete and then filtered. The filtrate is evaporated in vacuo to give sodium α-[2-(p-chlorobenzoyl)-5-methyl-1-benzimidazolyl] acetate.

Similarly there may be prepared the calcium and aluminum salts as well as other salts such as potassium, iron and magnesium of the benzimidazolyl acids described in the previous Examples, such as:

calcium α-[2-(p-methylulfamylbenzyl)-5-dimethylsulfamyl-1-benzimidazolyl] acetate;
potassium α-[2-(p-methylsulfinylbenzoyl)-5-methoxy-1-benzimidazolyl] acetate.

(B) To a solution of 0.01 mole of α-[2-(p-chlorobenzoyl)-5-methyl-1-benzimidazolyl] acetic acid in 100 ml. of ether at 0° C. is added a solution of 0.01 mole of morpholine in 50 ml. of ether, dropwise, with stirring. The mixture is filtered and the solution is dried in vacuo to yield the morpholine salt of α[2 - (p-chlorobenzoyl) - 5-methyl-1-benzimidazolyl] acetic acid.

In a similar fashion, other salts of organic bases are prepared by substituting them for morpholine in the reaction of this part, for example, triethylamine, ethanolamine, choline, butylamine, 2,3-xylidine and piperazine.

EXAMPLE 8

(A) N-methyl-α-[2 - (p-chlorobenzyl) - 5 - methyl-1-benzimidazolyl] acetamide.—A mixture of 0.01 mole of methyl α-[2-(p-chlorobenzyl) - 5-methyl-1-benzimidazolyl] acetate and 6 ml. of 33% alcoholic methylamine is heated in a sealed tube at 125° C. for twelve hours. The mixture is evaporated in vacuo and the residue is N-methyl-α-[2-(p-chlorobenzyl) - 5 - methyl-1-benzimidazolyl] acetamide.

(B) Utilizing the procedure of Part A, but substituting an equivalent quantity of morpholine, ethanolamine, benzylamine, piperidine, substituted piperidine, pyrrolidine, substituted pyrrolidine, piperazine, substituted piperazine, aniline, substituted aniline, phenethylamne, substituted phenethylamine, cyclohexylamine, lower alkyl amines, glucosamine, substituted glucosamine, tetrahydrofurfurylamine or β-methoxyethylamine, in place of methylamine, the corresponding amides are formed. A primary amide is produced when methylamine is replaced by ammonia.

(C) N,N - diethyl-α-[2-(p-chlorobenzyl) - 5 - methyl-1-benzimidazolyl] acetamide.—To a mixture of 0.01 mole of α-[2-(p-chlorobenzyl) - 5 - methyl-1-benzimidazolyl acetic acid, 0.041 mole of isobutyl chloroformate in 100 ml. dimethoxyethane is added 0.011 mole of diethylamine, with cooling. The mixture is stirred at 0° C. for one hour at room temperature for another two hours. The mixture is concentrated in vacuo to 30 ml. and is poured into water to give N,N-diethyl - α-[2-(p-chlorobenzyl)-5-methyl-1-benzimidazolyl] acetamide.

When other di-(lower alkyl)amines are substituted for diethylamine in the procedure of this part, the corresponding amides are produced, for example:

N,N-dipropyl-α-[2-(p-methylthiobenzyl)-5-morpholino-1-benzimidazolyl] acetamide;
N,N-diisobutyl-α-(2-benzylmercaptothiazole-4-carbonyl)-5-cyclobutylmethoxy-1-benzimidazolyl] acetamide.

EXAMPLE 9

(A) α-[2-(p-chlorobenzoyl) - 5 - methyl-1-benzimidazolyl] acetic anhydride.—Dicyclohexylcarbodiimide (0.049 M) is dissolved in a solution of 0.1 M of α-[2-(p-chlorobenzoyl) - 5 - methyl-1-benzimidazolyl] acetic acid in 200 ml. of tetrahydrofuran, and the solution is allowed to stand at room temperature for two hours. The precipitated urea is removed by filtration and the filtrate is evaporated in vacuo to yield the desired anhydride.

(B) Isobutyl α-[2-(p-chlorobenzoyl) - 5 - methyl-1-benzimidazolyl] acetic anhydride (mixed anhydride).— A solution of 0.01 mole of α[12 - (p-chlorobenzoyl)-5-methyl - 1 - benzimidazolyl] acetic acid in 100 ml. dimethoxyethane is treated with 0.01 mole of triethylamine with ice-cooling and stirring. After one hour, 0.011 mole of isobutyl chloroformate is added dropwise and the mixture stirred for four to eight hours at 0° C. to 5° C. The solution is filtered to remove precipitated triethylamine hydrochloride and evaporated in vacuo to give a concentrated solution of the mixed anhydride.

In like manner, using equivalent quantities of ethyl chloroformate, propyl chloroformate, phenyl chloroformate, p-nitrophenyl chloroformate and methyl chloroformate in the procedure of this part in place of isobutyl chloroformate, the corresponding mixed anhydrides are produced.

(C) When an equivalent quantity of any benzimidazolyl acid prepared heretofore is used in the procedures of this example, the corresponding symmetrical or mixed anhydride is produced, provided no replaceable hydrogen is present.

EXAMPLE 10

α-[2-(p-chlorobenzyl)-5-allyloxy-1-benzimidazolyl] acetic acid (A) α-[2-(p-chlorobenzyl) - 5 - hydroxy-1-benzimidazolyl] acetic acid.—One gram of α-[2-(p-chlorobenzyl)-5-methoxy-1-benzimidazolyl] acetic acid and ten grams of dry pyridine hydrochloride are heated at 180° C. for ten minutes. The reaction mixture is then cooled, diluted with water, filtered and washed with 100 ml. of water to produce α-[2 - (p-chlorobenzyl) - 5 - hydroxy-1-benzimidazolyl] acetic acid.

When other methoxy-containing compounds are used in the procedure of this part, the corresponding hydroxy compounds are produced, for example:

α-(2-benzyl-4-hydroxy-1-benzimidazolyl) acetic acid.

(B) α-[2-(p-chlorobenzyl) - 5 - allyloxy-1-benzimidazolyl] acetic acid.—A mixture of 0.1 mole of the product of Part A, 100 ml. dimethoxy ethane, 300 ml. of 2.5 N sodium hydroxide and 0.15 mole of allyl chloride is stirred vigorously at room temperature for 2–4 hours. The mixture is then extracted with ether and the aqueous layer is acidified to give the desired 5-allyloxy compound.

When cyclopentyl bromide is used in place of the allyl halide in this reaction, the corresponding 5-cyclopentyloxy compound is obtained.

EXAMPLE 11

α-[2-(p-chlorobenzoyl)-5-dimethylamino-1-benzimidazolyl] acetic acid

A total of 0.005 mole of α-[2-(p-chlorobenzoyl)-5-nitro-1-benzimidazolyl] acetic acid in 75 ml. of freshly distilled dimethoxyethane, 7.5 ml. of glacial acetic acid and 2.5 ml. of 37% aqueous formaldehyde is reduced in a 40 p.s.i. hydrogen atmosphere at room temperature, in the presence of about 2 grams of Raney nickel catalyst. After the theoretical amount of hydrogen has been taken up, the catalyst is filtered off and the filtrate is evaporated in vacuo. The residue is chromatographed on a thin layer of silica gel on glass plates, using a mixture of benzene-ethyl acetate as eluent and the desired band is then extracted with ethyl acetate. Evaporation of the solvent in vacuo yields α-[2-(p-chlorobenzoyl)-5-dimethylamino-1-benzimidazolyl] acetic acid.

EXAMPLE 12

α-[2-(p-chlorobenzoyl)-5-methoxy-1-benzimidazolyl] acetic acid (A) 2 - (α-hydroxy-p-chlorobenzyl)-5-methoxy benzimidazole.—A mixture of 0.1 mole of 4-methoxy-o-phenylenediamine and 0.15 mole of p-chloromandelic acid is refluxed in 100 ml. of 4 N hydrochloric acid for 1.5 hours under a nitrogen blanket. The reaction mixture is cooled, diluted with water and the mixture filtered and washed with water to yield 2-(α-hydroxy - p - chlorobenzyl)-5-methoxy benzimidazole.

(B) 2-(p-chlorobenzoyl)-5-methoxy benzimidazole.— A solution of 10.3 grams of sodium dichromate in 60 ml. of glacial acetic acid is heated on a steam cone and added to a warm solution of 0.05 mole of 2-(α-hydroxy-p-chlorobenzyl)-5-methoxy benzimidazole in 60 ml. of glacial acetic acid. The mixture is heated on a steam cone for ten minutes, cooled and diluted with water. The resulting precipitate is filtered and washed with water to yield 2-(p-chlorobenzoyl)-5-methoxy benzimidazole.

(C) Methyl α-[2-(p-chlorobenzoyl)-5-methoxy-1-benzimidazolyl] acetate.—A mixture of 0.04 mole of [2-(p-chlorobenzoyl)-5-methoxy benzimidazole] in 150 ml. of dry dimethylformamide is cooled to 0° C. and then 0.06 mole of sodium hydride is cautiously added. The mixture is stirred for twenty minutes and then 0.05 mole of methyl bromoacetate is added dropwise. After stirring overnight under a nitrogen atmosphere the mixture is poured into iced water and extracted with ethyl acetate. This ethyl acetate extract is washed with a 10% sodium dihydrogen phosphate solution, then water, dried over anhydrous sodium sulfate and concentrated in vacuo to produce methyl α-[2-(p-chlorobenzoyl)-5-methoxy benzimidazolyl] acetate, which is purified by chromatography.

(D) α-[2 - (p-chlorobenzoyl)-5-methoxy-1-benzimidazolyl] acetic acid.—The ester of Part C (0.02 mole) is refluxed for 2.5 hours with 0.02 mole ethanolic sodium hydroxide. The then reaction mixture is diluted with 100 ml. of water and neutralized with acetic acid. The gelatinous precipitate is filtered, washed with water and air-dried to give α-[2-(p-chlorobenzoyl)-5-methoxy-1-benzimidazolyl] acetic acid.

EXAMPLE 13

α-[2-(p-methylsulfinylbenzoyl)-5-methoxy-1-benzimidazolyl] acetic acid

A mixture of 0.005 mole of t-butyl α-[2-(p-methylsulfinyl)-5-methoxy-1-benzimidazolyl] acetate and about 1 g. of fine porous-plate chips is heated slowly in an oil bath, under nitrogen, until isobutylene starts to escape. Stirring is initiated and the temperature held constant for about one hour. On cooling, the residue is extracted with saturated sodium bicarbonate solution, filtered, the aqueous solution washed with 100 ml. ether, made neutral with 1 N hydrochloric acid and lyophilized to give α-[2-(p-methylsulfinyl benzoyl)-5-methoxy-1-benzimidazolyl] acetic acid.

What is claimed is:
1. A compound of the formula

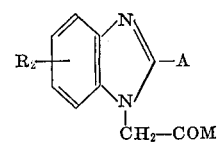

in which

A is benzoyl, and substituted benzoyl wherein the substituents are lower alkylthio, lower alkoxy, trifluoroacetyl, lower alkyl, acetyl, lower alkylsulfinyl, nitro, halo, trifluoromethyl or methylenedioxy;

$R_2$ is on the 5- or 6-position of the benzimidazole ring and is hydrogen, lower alkyl, lower alkoxy, nitro, bis-(hydroxy lower alkyl) amino, 1-pyrrolidino, 4-methyl-1-piperazinyl, 4-morpholinyl, halogen, 1-azacyclopropyl, or di(lower alkyl)amino;

M is hydroxyl, benzyloxy, lower alkoxy, β-acetaminoethoxy, allyloxy, or OZ where Z is a cation of an alkali metal, or alkaline earth metal.

2. A compound according to claim 1 where A is p-halobenzoyl; M is hydroxy, lower alkoxy, or benzyloxy; $R_2$ is lower alkoxy, halo, nitro or di(lower alkyl) amino.

3. α-[2-(p-chlorobenzoyl)-5-dimethylamino-1-benzimidazolyl] acetic acid.

4. α-[2-(p-chlorobenzoyl)-5-methoxy-1-benzimidazolyl] acetic acid.

5. α-[2-(p-methylsulfinylbenzoyl)-5-methoxy-1-benzimidazolyl] acetic acid.

References Cited

FOREIGN PATENTS 666,351    1/1966    Belgium _____ 260—309.2

OTHER REFERENCES

Irving et al., Jour. Chem. Soc. 1959, pp. 2296-8.

Jerchel et al., Liebigs Ann. Chem. vol. 590, pp. 232-41 (1954).

Seto et al., Jour. Pharm. Soc. (Japan) vol. 82, pp. 590-4 (1962).

Wheatley et al., Jour. Org. Chem. vol. 22, pp. 923-5 (1957).

NATALIE TROUSOF, Primary Examiner

U.S. Cl. X.R.

260—210, 211, 211.5, 247.1, 247.2, 247.5 250, 256.4, 256.5, 268, 287, 288, 291, 293.4, 294, 294.7, 294.8, 295 296, 304, 306, 306.8, 307 308, 999, 294.3

UNITED STATES PATENT OFFICE
CERTIFICATE OF CORRECTION

Patent No. 3,590,047           Dated June 29, 1971

Inventor(s) Tsung-Ying Shen, Alexander R. Matzuk, Harvey Schwam

It is certified that error appears in the above-identified patent and that said Letters Patent are hereby corrected as shown below:

In column 10, line 21, the word "p-methylulfamylbenzyl" should be --- p-methylsulfamylbenzyl ---;
    In column 10, line 61, "0.041" should be ---0.011---; and
    In column 11, line 12, "α[12-" should be --- α[2- ---.

Signed and sealed this 28th day of December 1971.

(SEAL)
Attest:

EDWARD M. FLETCHER, JR.      ROBERT GOTTSCHALK
Attesting Officer              Acting Commissioner of Patents